E. J. Moore.
Churn.
No. 83,080. Patented Oct. 13, 1868.
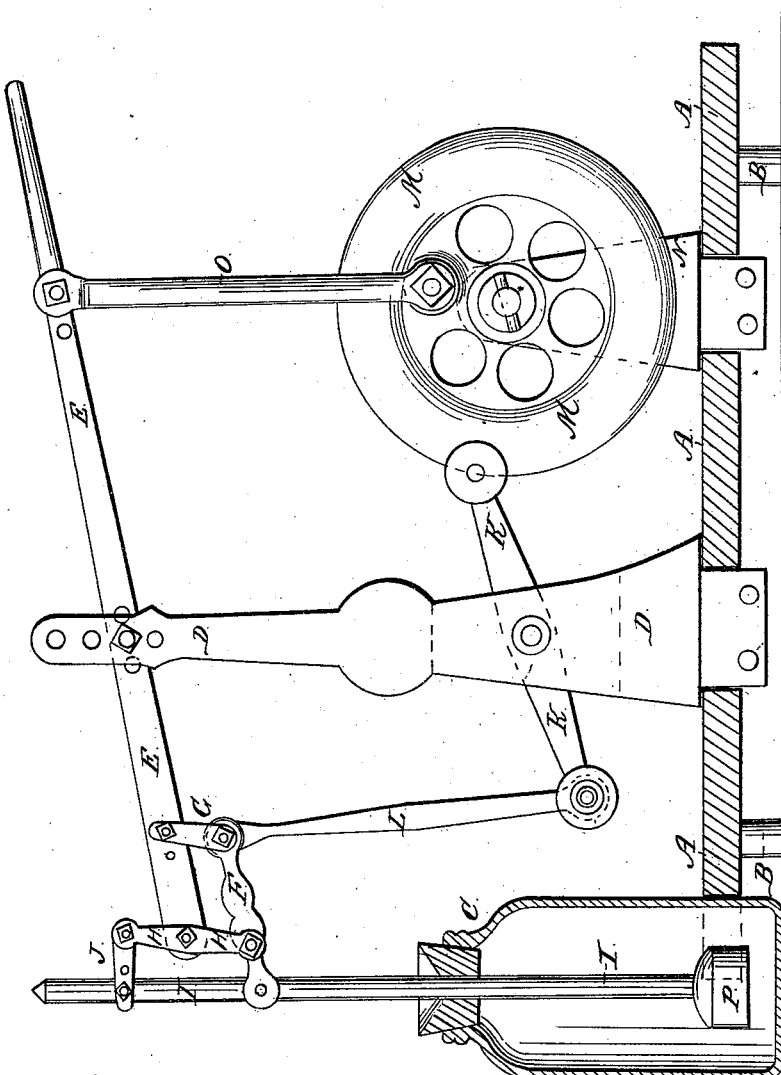
Witnesses:
Wm A Morgan
C. C. Cotton
Inventor:
E. J. Moore
per Munn & Co
Attorneys

EDWARD J. MOORE, OF WESTFIELD, NEW YORK.

Letters Patent No. 83,080, dated October 13, 1868.

IMPROVEMENT IN CHURNING-APPARATUS.

The Schedule referred to in these Letters Patent and making part of the same.

*To all whom it may concern:*

Be it known that I, EDWARD J. MOORE, of Westfield, in the county of Chautauqua, and State of New York, have invented a new and useful Improvement in Churning-Apparatus; and I do hereby declare that the following is a full, clear, and exact description thereof, which will enable those skilled in the art to make and use the same, reference being had to the accompanying drawing, forming part of this specification, in which the figure is a side view of my improved churning-apparatus, partly in section, to show the construction.

My invention has for its object to improve the construction of my improved churning-apparatus, patented April 17, 1868, and numbered 76,497, so as to make it more convenient and effective in operation; and it consists in the construction and combination of various parts, as hereinafter more fully described.

A is the platform or stand, which is mounted upon short feet, B, and the forward end of which is hollowed out into semicircular form, to receive the churn C, as shown in the figure.

D is an upright or standard, upon the lower end of which is formed one or more tenons, which enter mortises in the stand A, where they are removably secured in place by pins, as shown in the drawing.

The upper end of the upright, D, is slotted, to receive the main lever E, which is pivoted in place by a pin or bolt passing through one or the other of the holes through said lever, and through one or the other of the holes through the slotted upper end of the upright, D, so that the lever E may be adjusted as required.

F are two short bars or levers, placed beneath and parallel with the forward end of the lever E.

The bars F are kept at the proper distance apart by washers placed between them, and they are connected with the lever E by the short pivoted bars G and H.

The forward ends of the parallel bars or levers F project a little in front of the forward end of the lever E, and between them is pivoted the dasher-handle I.

The short pivoted bars H are extended a little above the lever E, and are connected with the dasher-handle I by the short pivoted bars J, so as to give greater steadiness of stroke to the dasher.

It will be apparent that by the use of these pivoted bars, the dasher-shaft is made to move in a perfectly vertical plane, preserving its parallelism with the bars H, the movement of the bars J, F, and G, compensating for the lateral movement of the dasher, occasioned by the lever E describing the arc of a circle as it is operated.

K is a weighted lever, which is pivoted, at or near its centre, in a slot in the lower part of the upright, D.

The forward end of the heavy or weighted lever K is connected with the rear ends of the parallel bars F by the connecting-bar L, the lower end of which is pivoted to the forward end of the weighted lever K, and the upper end of which is pivoted to the rear end of the parallel bars or levers F.

M is a heavy fly-wheel, the spindle of which is attached to the upper end of the short upright, N, the lower end of which has a tenon or tenons formed upon it, which enter mortises in the stand A, where they are removably secured in place by pins, as shown in the figure.

O is a connecting-bar, the upper end of which is adjustably pivoted to the rear part of the lever E, and the lower end of which is pivoted to the crank-pin of the fly-wheel M.

P is the dasher, which is made in the form of a heavy, solid block, of about ten or twelve pounds' weight, and which is made without holes or perforations, and with its top or upper side convex or rounded off, as shown in the figure.

I claim as new, and desire to secure by Letters Patent—

1. The combination of the pivoted bars J, H, F, and G with the lever E and dasher-shaft I, substantially as described, for the purpose specified.

2. The combination of the connecting-rod L with the heavy or weighted lever K, and with the parallel levers or bars F, substantially as herein shown and described, and for the purpose set forth.

3. Extending the pivoted bars H above the lever E, and connecting them with the dasher-handle I, by means of the short connecting-bars J, substantially as herein shown and described, and for the purpose set forth.

4. Extending the heavy or weighted lever K through the upright, D, and pivoting it at or near its centre, substantially as herein shown and described.

EDWARD J. MOORE.

Witnesses:
   A. H. LEITCH,
   A. P. CLOW.